Jan. 2, 1940.   A. W. SUDBURY   2,185,234
SANDER MECHANISM
Filed April 17, 1937   2 Sheets-Sheet 1

INVENTOR.
Alvin W. Sudbury.
Woodling and Krost.
ATTORNEY.

Jan. 2, 1940.  A. W. SUDBURY  2,185,234
SANDER MECHANISM
Filed April 17, 1937  2 Sheets-Sheet 2
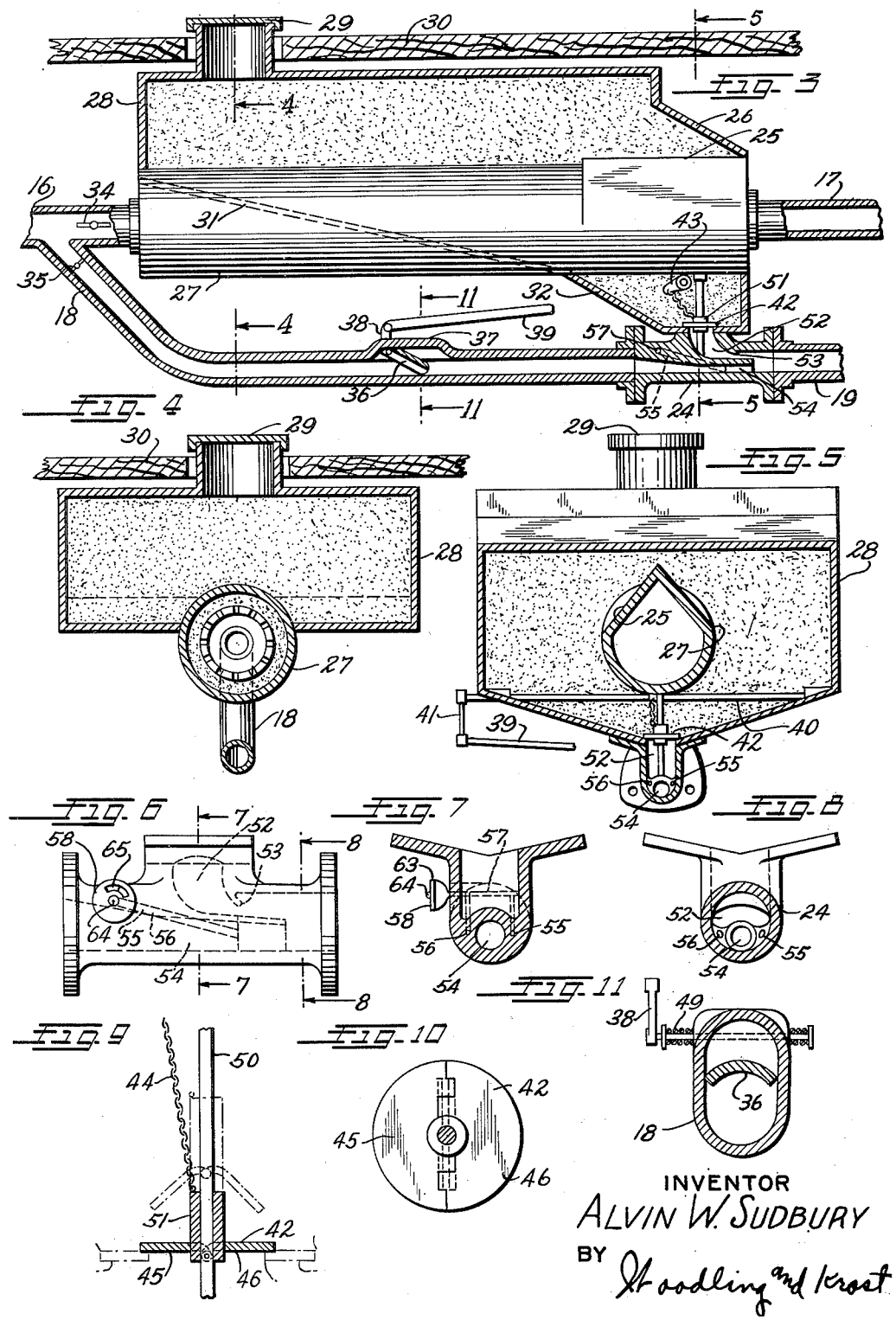
INVENTOR
ALVIN W. SUDBURY
BY Hoodling and Krost Patented Jan. 2, 1940

2,185,234

UNITED STATES PATENT OFFICE 2,185,234

SANDER MECHANISM

Alvin W. Sudbury, East Cleveland, Ohio

Application April 17, 1937, Serial No. 137,535

9 Claims. (Cl. 291—3)

My invention relates in general to sander mechanism and more particularly to sander mechanism for motor vehicles to prevent skidding of the wheels upon slippery surfaces.

An object of my invention is the provision of utilizing the heat liberated from the exhaust gases of a motor of a vehicle to warm the sand and prevent it from freezing, thereby insuring reliable operation at all times.

Another object of my invention is the provision of combining the sander mechanism with the muffler of a motor vehicle.

Another object of my invention is the provision of utilizing the exhaust gases to aid in delivering sand or other particles in advance of a wheel of the motor vehicle to prevent skidding.

Another object of my invention is to provide for controlling the feeding mechanism of my sander mechanism in response to the pressure of the exhaust gases of the motor vehicle.

A still further object of my invention is the provision of a feeding valve mechanism which prevents the sand from becoming clogged as it leaves the sand compartment.

Another object of my invention is the provision of drawing air into the feeding sand port to cause the air which is drawn in to aid in feeding the sand into the distributing conduit which carries and delivers the sand in advance of a wheel of the motor vehicle.

Another object of my invention is to provide for reducing the pressure of the exhaust gases immediately before the sand is delivered to the end of the distributing conduit to give a good distributing action to the sand in advance of the wheel of the motor vehicle.

Another object of my invention is the provision of constructing the sander mechanism and the muffler as a unit.

Another object of my invention is to provide for diverting the exhaust gases from the muffler and utilizing the diverted exhaust gases for aiding in the delivery of the sand from the sander mechanism in advance of a wheel of the motor vehicle.

Another object of my invention is to provide for controlling the operation of my sander mechanism from a point located convenient to the driver of the motor vehicle.

Other objects and a fuller understanding of my invention may be had by referring to the following description and claims, taken in combination with the accompanying drawings in which, like reference characters designate like parts of my invention, and in which:

Figure 3 represents a longitudinal cross-sectional view of my invention and shows the combined assembly of my sander mechanism and the muffler;

Figure 4 represents a cross-sectional end view of my combined sander mechanism and muffler, taken along the line 4—4 of Figure 3;

Figure 5 represents a cross-sectional end view of my combined sander mechanism and muffler, taken along the line 5—5 of Figure 3;

Figure 6 represents an enlarged side elevational view of a sand feed housing where the sand is fed into the distributing pipe;

Figure 7 is a cross-sectional end view of the sand feed housing, taken along the line 7—7 of Figure 6;

Figure 8 is a cross-sectional end view of the sand feed housing, taken along the line 8—8 of Figure 6;

Figure 9 is an enlarged and cross-sectional view of the sand valve mechanism for controlling the discharge of the sand into the sand feed housing;

Figure 10 is a plan view of the sand valve mechanism shown in Figure 9; and

Figure 11 is a cross-sectional view of an enlarged portion of a by-pass pipe, taken along the line 11—11 of Figure 3.

Figure 1:
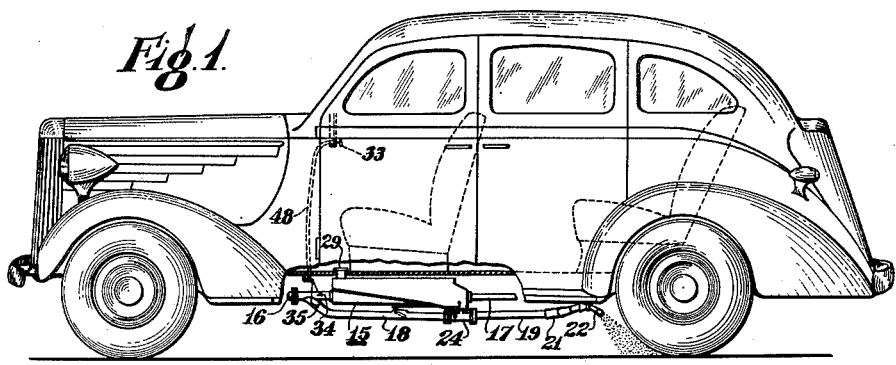
Figure 1 illustrates a side view of a motor vehicle to which my invention may be applied, parts of the side of the motor vehicle being cut away to illustrate more clearly the mounting of my invention.
Figure 2:
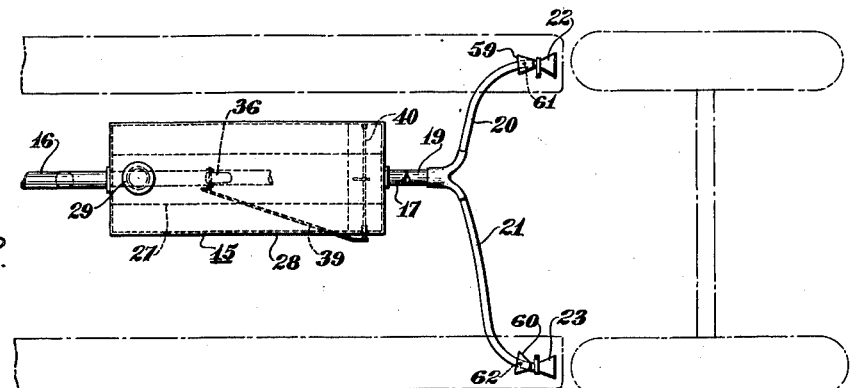
Figure 2 illustrates a plan view of my invention as applied to a motor vehicle, the dash and dot lines indicating fragmentary portions of the motor vehicle and the rear wheels.

With reference to the drawings, the reference character 15 designates generally my combined sander mechanism and muffler. The muffler may be of any suitable design for deadening the sound of the exhaust gases of the motor of the vehicle. The front end of the muffler may be connected in communication with the exhaust manifold of the motor by means of the exhaust pipe 16. The exhaust gases after passing through the muffler may be discharged through a rear exhaust pipe 17.

As illustrated best in Figure 3, at a point in advance of the muffler, the exhaust gases flowing in the exhaust pipe 16 may be diverted through a by-pass pipe 18. The exhaust gases upon passing through the by-pass pipe 18 flow through a sand feed housing 24 having a restricted portion 54, and then through a distributing conduit 19 which divides into two distributing pipes 20 and 21 for delivering the sand, with the aid of the exhaust gases, in advance of the rear wheels. The ends of the pipes 20 and 21 may be flattened as indicated at 22 and 23 to give a good distributing and spreading action to the sand as it is thrust in advance of the rear wheels.

Encompassing a portion of the housing 27 of the muffler, is a sand compartment 28. As illustrated best in Figure 3, the bottom of the sand compartment is disposed at a double incline to cause the sand to slide back to the rear of the compartment. The major and the forward part of the double inclined bottom is designated by the reference character 31 and the rearward minor part of the double inclined bottom, having a greater slope than that of the forward part 31, is designated by the reference character 32. The inclined bottom portions 31 and 32 are so arranged that the sand does not become packed too tight in the rear of the sand compartment 28, which would tend to prevent the free flow of the sand into the distributing pipe. The sand compartment 28 may be filled by pouring said through an opening which extends through the floor board 30 of the motor vehicle and which has a removable cap 29, making it readily accessible for filling. The rear of the muffler housing 27, beginning at a place substantially above the juncture of the two inclined bottom portions 31 and 32, has sloping sides 25, see Figure 5. This prevents the sand from sticking to the sides of the muffler and causes it to fill the lowermost part of the sand compartment 28. The back of the sand compartment 28 is sloping as indicated by the reference character 26 to keep the bulk of the sand from becoming too great over the sand valve mechanism 42. The sloping back 26 also directs the sand downwardly in a scattered fashion in the case of a sudden stop where the sand in the forward part of the sand compartment is thrust against the back. This prevents the packing of the sand in the rear of the sand compartment, and insures the free flow of the sand through the sand valve mechanism 42.

The sand in the rear of the compartment flows through the sand valve mechanism 42 into a sand feed port 52, where the sand is introduced into the distributing pipe 19. As illustrated in Figures 9 and 10, the sand valve mechanism 42 comprises two hinged semi-circular parts 45 and 46 having their inner ends pivotally connected to the lower end of a sleeve 51 which slides up and down upon a guide rod 50 having its lower end suitably connected to the inside surface of the sand feed port 52 and its upper end fastened to the underneath side of the muffler housing 27. When the sand valve mechanism 42 is raised, the two semi-circular hinged parts 45 and 46 slope downwardly, as indicated by the dotted view in Figure 9, and cause the sand to slide off into the said port 52. This prevents the clogging of the sand. When the valve 24 is lowered the two semi-circular hinged parts 45 and 46 flatten out and cover the port 52 as indicated by the full lines in Figure 9. The sleeve 51 may be raised to allow the sand to flow into the sand feed port 52 by means of a lift chain 44 which is governed by a pivotally mounted pilot exhaust pressure vane 36 positioned in an enlarged portion 37 of the by-pass pipe 18. The pilot vane 36 is normally urged closed by a spring 49, see Figure 11. When the pilot vane 36 is raised by the pressure of the exhaust gases against the urge of the springs 49, the upper end of the pilot arm 38 is moved to the left as shown in Figure 3. This causes the pilot rod 39, which has its rear end connected to an actuating arm 41, to turn and rotate the cross-rod 40 (see Figure 5).

The turning of the cross-rod 40 lifts the arm 43, which raises the lift chain 44 and the sleeve 51. This allows the sand to slide off the sides of the hinged parts 45 and 46 of the valve 42 and to flow into the sand feed port 52. The enlarged portion 37 at the place where the pilot vane 36 is mounted allows the exhaust gases to flow substantially unrestricted, because the vane 36 may be elevated well into the enlarged portion.

When the sand slides down past the sand valve mechanism 42 and in the port 52 there is a tendency for the exhaust gases to escape backwards through the feed port 52 and raise the sand and thus prevent it from falling into the distributing pipe 19. To overcome this, I provide air communicating means shown in Figures 3, 6, 7, and 8. The air communicating means comprises two longitudinal ducts 55 and 56 and a cross-duct 57 which is connected to atmosphere. The outer end of the cross-duct 57 is provided with an adjustable air intake port 58 having a turnable shield 63 with an opening 65 and held against rotation by a screw 64. Therefore, when adjusting the size of the air opening 65, it is only necessary to loosen the screw 64 and turn the shield 63 to provide either an enlarged or a restricted opening, see Figure 6. The forward ends of the longitudinal air duct 55 and 56 terminate within the sand feed port 52 in advance of the place where the sand feed port 52 communicates with the restricted exhaust portion 54. Therefore, as the gas flows to the rear through the restricted portion 54 and then into the enlarged portion, there is a rarification of the air in the vicinity of the sand feed port 52, with the result that air is drawn in through the adjustable opening 65, the cross-duct 57 and the two longitudinal ducts 55 and 56, and when it enters the sand feed port 52, it carries the sand along with it into the distributing pipe 19. The adjustable opening 65 may be properly adjusted to give the right flow of air to draw the sand into the distributing pipe 19. Also, a projection 53 is provided in the roof of the sand port 52 to prevent the sand, as much as possible, from re-entering the sand port 52 by reason of any back pressure of the exhaust gas. As the exhaust gases carry the sand along with it through the divided distributing pipes 20 and 21, there may be a tendency of the exhaust gases to discharge the sand at too rapid a rate. To prevent this, the end of the pipes 20 and 21 are provided with side openings 61 and 62 which are shielded with a shield 59 and 60 respectively. Therefore, the exhaust gases as it approaches the ends of the spreaders 22 and 23 is reduced in pressure with the result that the sand is given a gradual downward thrust in advance of the rear wheels to prevent skidding.

The operation of my sander mechanism is controlled by a manual actuating plunger 33 which is readily accessible by the driver when sitting in the driver's seat. The actuating plunger 33 is connected by means of flexible wire 48 to butterfly valves 34 and 35, see Figure 3. In the normal operation of the car, the manual controlled plunger 33 is pushed in and the butterfly valve 34 is horizontal in its opened position and the butterfly valve 35 is closed. With this situation, the exhaust gases are constrained to flow through the muffler and none through the by-pass and the distributing pipes. However, when it becomes necessary to use sand to prevent skidding, the manually operated plunger 33 is pulled out and the valve 34 is now closed and the valve 35 is opened. This means that the exhaust gases are now diverted from the muffler and constrained to flow through the by-pass pipe 18, the restricted portion 54 of the sand feed housing 24, where the sand is drawn in with the exhaust gases, after which the gas and the sand travel through the distributing pipe 19, thence dividing through the pipes 20 and 21 where the sand is carried and evenly distributed to each rear wheel to prevent skidding. The exhaust gases, which lift the pilot vane 36, cause the pilot vane to fluctuate. This fluctuating motion is transmitted to the sand valve mechanism 42 and provides positive agitation of the sand and insures reliable operation at all times, because there is no possibility of the sand becoming clogged as it enters the sand feed port 52 prior to passing into the distributing pipe 19.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. The combination of a sander mechanism and a muffler for a motor vehicle comprising, in combination, a muffler connected in communication with the exhaust manifold of the motor of the vehicle, a sander mechanism having a sand compartment mounted adjacent the muffler, so that the heat liberated from the muffler may warm the sand to keep it dry and to prevent it from freezing, a distributing conduit having a port in communication with said sand compartment for delivering sand in advance of a wheel of the motor vehicle, means for connecting the distributing conduit in communication with the exhaust manifold of the motor of the vehicle, feed means for controlling the flow of the sand from said sand compartment to the distributing conduit, control means for diverting the exhaust gases from the muffler through the distributing conduit, and vane means positioned in advance of said port and actuated by the exhaust gases flowing through the distributing conduit and connected to said feed means to control the feed means so that said feed means is in an open position when the exhaust gases flow through the distributing conduit and is in a closed position when the gases do not flow through the distributing conduit.

2. A sander mechanism for a motor vehicle comprising, in combination, a sand compartment, means for causing the exhaust gases of the motor vehicle to warm the sand and prevent it from freezing, a distributing conduit having a port in communication with said sand compartment for delivering sand in advance of a wheel of the motor vehicle, means for connecting the distributing conduit to the exhaust manifold of the motor, shut-off means for governing the feed of the sand from said sand compartment to the distributing conduit, and pilot means positioned in advance of said port within the path of, and actuated by, the exhaust gases flowing through the distributing conduit and connected to the shut-off means to control the shut-off means so that said sand is released by the feed means only when the exhaust gases flow through the said distributing means.

3. The arrangement for introducing sand into a conduit through which gas under pressure flows comprising, in combination, a sand hopper, a conduit having a passage through which the gas flows, said conduit also having a sand feed port extending from a connection with the sand hopper to the conduit and leading into the said passage through which the gas flows, the place at which the said port and the said passage communicate with each other being in rear of the place where the port is open to the sand hopper connection, said conduit also having air communicating means extending from the outside of the conduit into the said passage at a place in advance where the said port and said passage communicate to cause the air which is drawn in through the air communicating means to auxiliate the gas flowing past said port to aid in introducing the sand into the said passage through which the gas flows.

4. A sander mechanism for a motor vehicle comprising, in combination, a sand compartment, means for causing the exhaust gases of the motor vehicle to warm the sand and prevent it from freezing, a distributing conduit having a port in communication with said sand compartment for delivering sand in advance of a wheel of the motor vehicle, means for feeding the sand into the distributing conduit, means for causing the exhaust gases of the motor to flow through the distributing conduit and aid in delivering the sand through the distributing conduit in advance of a wheel of the vehicle, and means positioned in the path of the exhaust gases flowing through the distributing conduit in advance of said port and responsive to the exhaust gases for controlling the feeding means and for synchronizing the flow of exhaust gases through the distributing conduit and the feeding of sand into the distributing conduit.

5. The combination of a sander mechanism and a muffler for a motor vehicle comprising, in combination, a muffler connection in communication with the exhaust manifold of the motor of the vehicle, a sander mechanism having a sand compartment mounted adjacent the muffler, so that the heat liberated from the muffler may warm the sand to keep it dry and to prevent it from freezing, a distributing conduit adapted to conduct exhaust gases from said manifold and to deliver sand in advance of a wheel of the motor vehicle, means for connecting the distributing conduit in communication with the exhaust manifold, control means for diverting the exhaust gases from the muffler through the distributing conduit, a sand feed conduit communicating with said sand compartment and with the distributing conduit and having its lower end disposed substantially parallel to said distributing conduit, the cross-sectional area of the distributing conduit being enlarged at the junction of the distributing conduit and the sand feed conduit inducing rarification of gases at said junction, valve means for controlling the flow of sand through said sand feed conduit from the sand compartment, and auxiliary air means communicating with atmosphere and communicating with the high pressure exhaust gas portion of the distributing conduit at a point in advance of where the conduit communicates with the sand feed port to add air to the said rarified gases flowing past said junction to carry sand from said sand feed conduit rearwardly through said distributing conduit.

6. A sander mechanism for a motor vehicle comprising, in combination, a sand compartment, a distributing conduit for delivering sand in advance of a wheel of the motor vehicle, connecting means connected to said motor for causing the exhaust gases of the motor to flow through the distributing conduit to aid in delivering sand through the distributing conduit in advance of said wheel, said distributing conduit having a sand feed port extending from a connection with the sand compartment to the conduit and opening into the conduit at a junction rearwardly of said connection with the sand compartment, and air communicating means extending from atmosphere on the outside of the conduit and opening into the high pressure exhaust gas portion of the conduit at a point in advance of where the conduit communicates with the sand feed port to draw air into the conduit by the flowing of said gases to augment the gases flowing past said junction and to aid in drawing sand from said port and conducting the sand through the conduit.

7. A sander mechanism for a motor vehicle comprising, in combination, a sand compartment, means for causing the exhaust gases of the motor vehicle to warm the sand and prevent it from freezing, a distributing conduit for delivering sand in advance of a wheel of the motor vehicle, means for causing the exhaust gases of the motor to flow through the distributing conduit to carry sand therethrough, said conduit having a sand feed port extending from a connection with the sand compartment to the conduit and leading into the conduit intermediate of the ends of said conduit, means for governing the feed of the sand from the compartment through the said connection to the feed port, the place at which the port communicates with the conduit being in rear of the said connection with the compartment, and air communicating means extending from atmosphere and communicating with the high pressure exhaust gas portion of the conduit at a point in advance of said place where the port communicates with the conduit to draw auxiliary air into the conduit so that said gases and auxiliary air flowing past said port carry sand therefrom and rearwardly through the conduit.

8. A sander mechanism for a motor vehicle comprising, in combination, a sand compartment, means for causing the exhaust gases of the motor vehicle to warm the sand and prevent it from freezing, a distributing conduit for delivering sand in advance of a wheel of the motor vehicle, means for causing the exhaust gases of the motor to flow through the distributing conduit to carry sand therethrough, said conduit having a sand feed port extending from a connection with the sand compartment to the conduit and leading into the conduit intermediate of the ends of said conduit, means for governing the feed of the sand from the compartment through the said connection to the feed port, the place at which the port communicates with the conduit being in rear of the said connection with the compartment, air communicating means extending from atmosphere into the conduit in advance of said place where the port communicates with the conduit to draw auxiliary air into the conduit so that said gases and auxiliary air flowing past said port carry sand therefrom and rearwardly through the conduit, and control means positioned in the path of, and responsive to, the flow of exhaust gases flowing through the said conduit for controlling the feed means.

9. The combination of a sander mechanism and a muffler for a motor vehicle comprising, in combination, a muffler connected in communication with the exhaust manifold of the motor of the vehicle, a sander mechanism having a sand compartment mounted adjacent the muffler, so that the heat liberated from the muffler may warm the sand to keep it dry and to prevent it from freezing, a distributing conduit having a port in communication with said compartment for delivering sand in advance of a wheel of the motor vehicle, connecting means for connecting the distributing conduit in communication with the exhaust manifold of the motor of the vehicle, feed means for controlling the flow of the sand to the distributing conduit, control means for diverting the exhaust gases from the muffler through the distributing conduit, means actuated by the exhaust gases flowing through the distributing conduit to control the feed means, and an air duct extending through the distributing conduit and communicating with atmosphere and opening into the distributing conduit at the junction of said port and said connecting means to provide the addition of air drawn in by said exhaust gases flowing through the connecting means for moving sand from said port through the distributing conduit.

ALVIN W. SUDBURY.